United States Patent [19]

Bould et al.

[11] 3,967,083
[45] June 29, 1976

[54] METHOD AND APPARATUS FOR ALIGNING AND AFFIXING PORTIONS OF CIRCUIT BREAKER APPARATUS

[75] Inventors: Fred Bould, Pittsburgh; Norman Davies, East Pittsburgh, both of Pa.

[73] Assignee: Westinghouse Electric Corporation, Pittsburgh, Pa.

[22] Filed: Aug. 27, 1974

[21] Appl. No.: 500,997

[52] U.S. Cl. .................................. 200/237; 151/37; 403/388; 52/758 F
[51] Int. Cl.² ........................................... F16B 5/02
[58] Field of Search ............. 52/758 F, 726; 151/37; 403/388, 389, 390; 200/249, 286, 283, 237

[56] References Cited
UNITED STATES PATENTS

| | | | |
|---|---|---|---|
| 1,411,184 | 3/1922 | Rosenberg | 52/758 F |
| 2,444,276 | 6/1948 | Aldrich | 403/388 |
| 2,914,149 | 11/1959 | Walker | 52/758 F |
| 3,102,746 | 9/1963 | Kerr | 403/388 X |
| 3,165,136 | 1/1965 | Horton | 151/37 X |
| 3,687,184 | 8/1972 | Wagner | 151/37 |
| 3,823,526 | 7/1974 | Rose | 52/758 F |
| 3,828,515 | 8/1974 | Galgoczy | 403/388 X |

FOREIGN PATENTS OR APPLICATIONS 902,471   8/1962   United Kingdom................. 200/283

*Primary Examiner*—Herman Hohauser
*Attorney, Agent, or Firm*—M. J. Moran

[57] ABSTRACT

A washer is disposed axially on a bolt between two portions which are to be secured by the bolt. The portions have holes or openings therein, which are larger than the diameter of the bolt for providing a range alignment between the portions and the bolt. The washer has a sharp circumferential lip edge on each side thereof which is generally parallel to the axis of the bolt. The edges protrude into the respective portions once the bolt has been axially tightened to thereby secure the portions in a predetermined disposition relative to each other. Lateral movement of the portions relative to each other is thus prevented or reduced.

22 Claims, 23 Drawing Figures

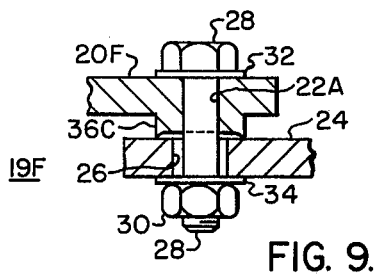
FIG. 9.
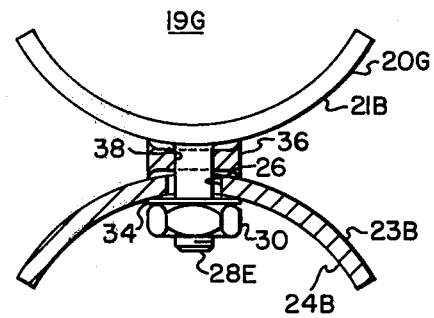
FIG. 10.
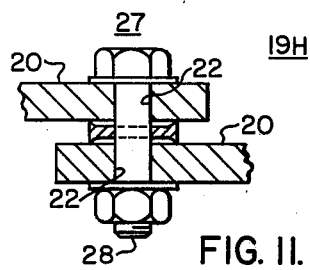
FIG. 11.
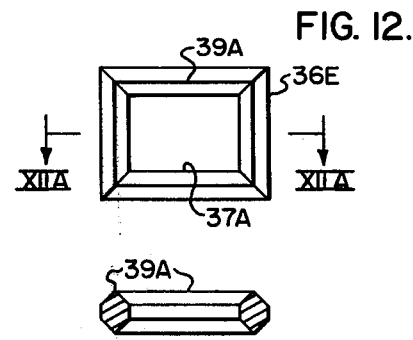
FIG. 12.
FIG. 12A.
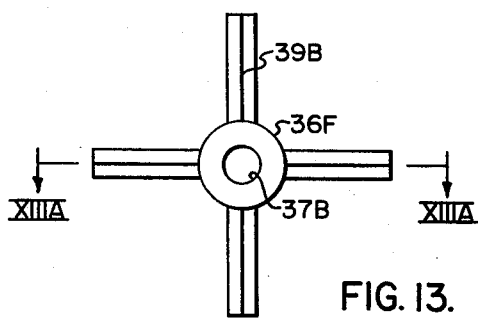
FIG. 13.
FIG. 13A.

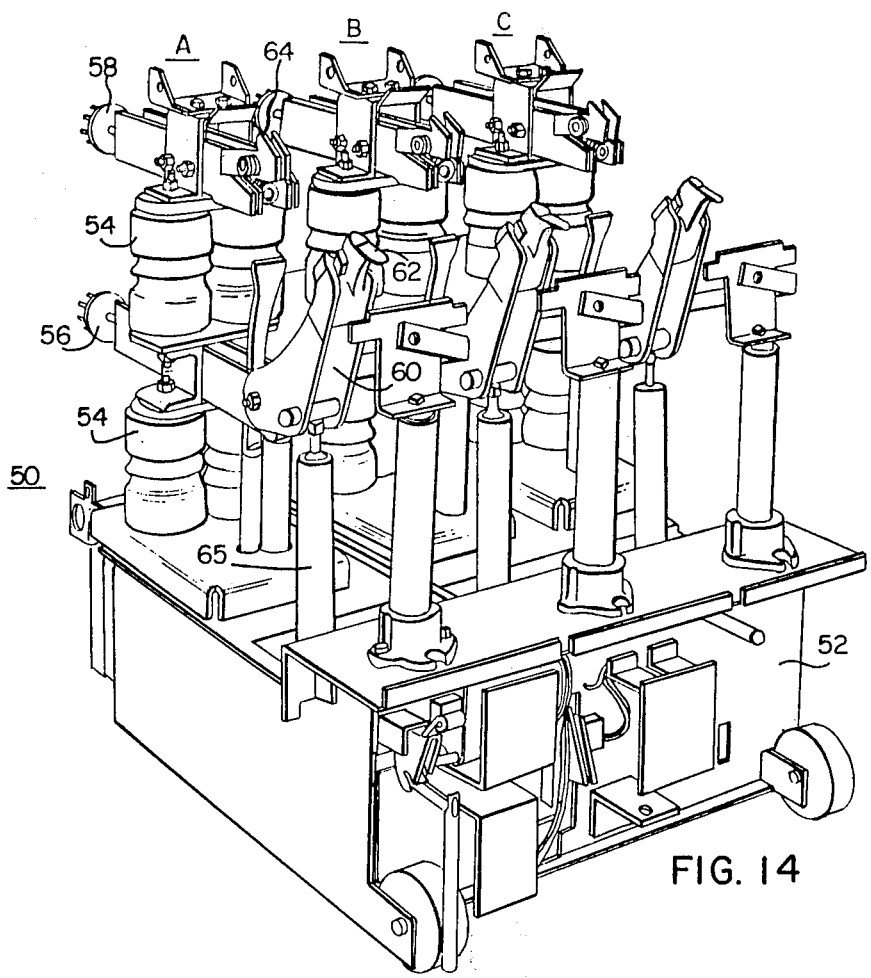
FIG. 14
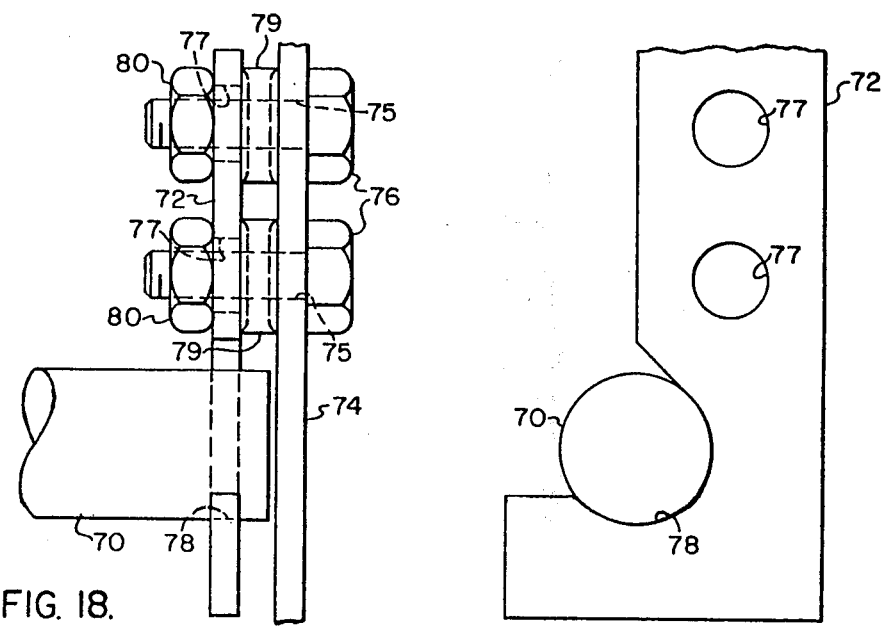
FIG. 18.
FIG. 17.

3,967,083

METHOD AND APPARATUS FOR ALIGNING AND AFFIXING PORTIONS OF CIRCUIT BREAKER APPARATUS

BACKGROUND OF THE INVENTION

The invention described and claimed herein relates generally to processes and apparatus for aligning two portions having generally flat alignment surfaces and then preventing further lateral movement thereof. The invention relates specifically to apparatus and method describing an adjustable support member for providing support to certain portions of a rotatable shaft in the opening and closing mechanism of a circuit interrupter or switch assembly. The invention also specifically relates to apparatus and method for positioning bushings and pole pieces of a circuit interrupter during assembly to provide accurate alignment thereof with a complementary stationary contact.

It is known in the prior art to utilize method and apparatus for affixing certain portions of bolts and their corresponding nuts with flat planar surfaces to prevent certain kinds of motion. As an example, the common lock washer, such as shown in U.S. Pat. No. 1,786,502, issued Dec. 30, 1930 to H. G. Norwood is utilized to provide springlike compression between a nut on a bolt and a flat surface through which the bolt protrudes. The axial pressure provided by the spring-compression of the lock washer as the nut is tightened upon it has a tendency to lock the nut in place relative to the flat surface. Another lock washer device is generally known as the star shaped lock washer. This washer is provided between a flat surface and a nut to prevent the nut from rotating once it has been tightened onto the star shaped lock washer. The star shaped lock washer generally has radial protruding portions which provide pressure against the nut and the flat surface, or in some cases actually dig into the nut and/or the flat surface to prevent the rotational motion of the nut about its bolt. It is also known in the prior art to provide adjustable link members. Two examples are shown in U.S. Pat. No. 566,323 issued Aug. 25, 1896 to J. J. Kelleher and H. Irwin and U.S. Pat. No. 1,652,677 issued Dec. 13, 1927 to W. F. McCoy et al. Both of the previously described patents utilize the concept of pre-cut matching incremental indexed grooves which allow for adjustment in small increments between parts of the linkage. The manufacturer of switch gear equipment, such as circuit breakers and switch assemblies, requires in many cases utilization of adjustable portions to provide alignment, but which thereafter can be securely positioned to prevent further movement of one portion of the link relation to the other. As an example, in the past it has been the practice to mount an insulated bushing having a steel channel at the bottom thereof into a support member at the base of a circuit breaker apparatus. The bushing is positioned in the previously described base apparatus so that a knife blade or pole piece on another portion of the bushing may be aligned with a separate contact for the subsequent making and breaking of a circuit. In the past, the adjustment was accomplished by first making a proper alignment and then simultaneously drilling matching holes in the complementary channel and the base support which holds and accommodates a bolt. The bolt is generally utilized in conjunction with a nut to tighten the two pieces in the aligned position to prevent further relative lateral movement. Also, certain shaft mechanisms of a circuit breaker that are movable into and out of engagement with each other, must be supported at outboard portions thereof or flexing of the shaft, rather than rotation thereof, may occur as magnetic and electrical forces interact with the closed contact. It would be advantageous therefore to provide means for supplementary supporting the latter mentioned shaft so that flexure of the shaft would be minimized. It would also be advantageous to provide an apparatus and method for securing the bottom member of the previously described insulated bushing to the previously described base member which apparatus and method did not require drilling after alignment. The cost involved in drilling after alignment is significantly larger than the cost of providing pre-punched members. However pre-punched members provide a disadvantage in the fact that if the pre-punched holes are the same diameter as the bolt which adjoins one member to another, then flexibility in adjustment has been reduced. However, if the hole is sufficiently large to provide flexibility of adjustment, then the opportunity for undesired movement into nonalignment of one part relative to the other after adjustment is increased. It would be advantageous therefore to provide means for adjusting the relative position of two flat surfaces with respect to each other and also to provide a securely affixed arrangement of the two parts relative to each other after desired alignment has been made.

SUMMARY OF THE INVENTION

In accordance with the invention method and apparatus are taught for securing one member which may have a generally flat surface to another member which also may have a generally flat surface after alignment has been made between the members. This is accomplished by providing clearance holes in the two previously described members which are significantly larger than the securing bolt or means which must pass therethrough. Consequently, freedom exists for adjusting the position of one member relative to the other in a lateral direction, that is, along the flat surfaces of either portion. To prevent relative lateral motion as opposed to rotational motion of the members, once proper adjustment or positioning has been made, a generally circular washer is provided on the bolt between the two flat surfaces. The washer may have a circumferential edge on either side thereof which is parallel to the axis of the bolt for digging into the surfaces thus preventing lateral movement of one member with respect to the other member once the bolt has been tightened. In one embodiment of the invention this concept is utilized to help provide support for a portion of a rotatable shaft which has a link affixed thereto which in turn is attached to a closeable circuit breaker arm or switch arm. When closed, the circuit breaker arm or switch arm must under certain electrical and magnetic conditions have a tendency to open. A locking mechanism provided adjacent to a portion of the shaft prevents rotation of the shaft as the opening pressure is applied backwards through the linkage to the shaft. However, means must be provided to prevent shaft flexure as opposed to rotation and the previously described means accomplishes this purpose. A support member is secured to a fixed portion of the base in which the shaft assembly is rotatable. The support member is bolted to or affixed to a generally C-shaped portion which supports the shaft from the portion thereof. Adjustment is provided between the C-shaped portion and the base.

The adjustment utilizes the previously described inventive concept for alignment and subsequent securing of the members. In another embodiment of the invention as insulating support piece which has one portion of a movable electrical contact hinged thereon at one end thereof, and a support piece or base of the other end thereof is secured to the frame of a circuit interrupter or switch apparatus. It is necessary to align the movable contact portion with another spaced, fixed contact which had previously been placed on the frame. The inventive concept is utilized to achieve alignment and locking of the base of the insulator to the frame.

BRIEF DESCRIPTION OF THE DRAWINGS

For a better understanding of the invention reference may be had to the preferred embodiments exemplary of the invention shown in the accompanying drawings in which:

FIG. 9 shows a two member, integral lock means with bolt interconnection;

FIG. 10 shows a curvilinear two member, single stud-lock means interconnection;

FIG. 11 shows a two member, single bolt single lock means interconnection with bolt size member holes;

FIG. 12 shows a view of an angular locking washer;

FIG. 12A shows a view through XIIA—XIIA of FIG. 12.

FIG. 13 shows a view of a radial arm locking washer;

FIG. 13A shows a view through XIIIA—XIIIA of FIG. 13.

FIG. 14 shows an orthogonal view of a three pole circuit breaker utilizing the invention;

FIG. 17 shows a side view of an adjustable support member for utilization in the apparatus of FIG. 14;

FIG. 18 shows an enlarged view of the adjustable support member of the circuit breaker of FIG. 14;

DETAILED DESCRIPTION OF THE DRAWINGS

Figure 1:
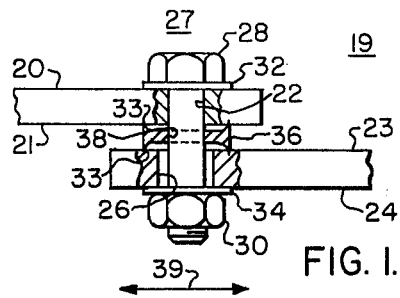
FIG. 1 shows a two member, single bolt interconnection.

Referring now to the drawings, and FIG. 1 in particular, a portion of an adjustable interconnecting link apparatus 19 is shown. There is shown a first member or link 20 having a generally planar portion 21 and a central opening or hole 22. There is also shown a second member 24 having a planar portion 23 and a central hole or opening 26. The cross sectional area or diameter as the case may be of the opening or hole 26 may be generally larger than the cross sectional area or diameter of the hole or opening 22. A locking assembly 27 is provided for joining the members 20 and 22 in a parallel plane, face-to-face, spaced relationship. Member 27 may comprise a bolt 28 threaded at one end thereof and having attached thereto a corresponding nut 30. There may also be washers 32 and 34 for performing normal washer functions. Washer 34 may provide the function of covering the generally large diameter or cross sectional area hole or opening 26 to thereby allow the nut 30 to be tightened on the threads of the bolt 28. The shaft of the bolt 28 extends through the hole 22 and the hole 26 as well as through corresponding accommodating holes in the washers 32 and 34. The nut 30 is threaded upon the threaded portion of the shaft of the bolt 28. A locking means or washer 36 having a central opening 38 is provided on the shaft of the bolt 28 between the generally planar surfaces 21 and 23. Adjustable interconnection of the members 20 and 24 of the apparatus 19 may be made by snugging the bolt 30 against the washer 34 to thus cause the flat planar portion 23 to abut against a serrated edge 33 on one side of the locking means or washer 36 without having the serrated edge pierce the planar portion 23. In a like manner, the planar portion 21 is snugged against the other serrated edge 33 on the other side of the washer or locking means 36. At this point the member 24, because of the relative large size, diameter or cross-sectional area of the hole 26 relative to the size diameter or cross-sectional area of the shaft of the bolt 28, may be adjusted in direction 39, for example, to change the arrangement or adjustment of the piece or member 24 relative to the piece or member 20. It is to be understood that adjustment may also be made in other directions generally transverse to the axis of the shaft of the bolt 28. Once the desired adjustment has been made between the member 20, and the member 24 the nut 30 may be further tightened on the shaft of the bolt 28 to cause the serrated edges 33 to pierce the surfaces 21 and 23, thus interlocking members 20 and 23 and preventing those members from moving in direction 39 or in any other direction transverse to the axis of the bolt 28 except rotationally about the axis of the bolt 28. Consequently, the interlocking apparatus in FIG. 1 may be thought of as preliminarily adjustable and thereafter securely fixable to prevent relative movement in certain directions. The range of adjustment with respect to the interlinking apparatus of FIG. 1 is controlled by the relative size, cross-sectional area or diameter of the hole 26 compared with the size, cross-sectional area or diameter of the shaft of the bolt 28. As an example, member 24 may be positioned to the right so that the left wall portion of the hole 26 as shown in FIG. 1 abuts the left portion of the shaft of the bolt 28, as shown in FIG. 1. Or the adjustment may be made to the left, such that the right portion of the wall of the hole 26 may abut against the right portion of the shaft of the bolt 28. If the shaft and/or the hole 26 are circular, for example, the adjustment may be made, not only to the left and to the right, but into and out of the plane of FIG. 1 and in any direction parallel to the flat surface 23 of the member 24. In a like manner, more adjustment may be provided for the interlinking apparatus 19 by also making hole 22 larger than the shaft of the bolt 28.

Figure 2:
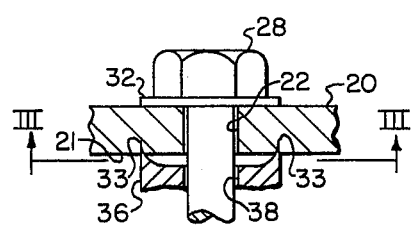
FIG. 2 shows an enlarged view of a portion of FIG. 1.

The continuous adjustment feature provided by the washer or locking means 36 is more fully described by referring to FIG. 2. The head of the bolt 28 is shown abutting against the washer 32 which in turn abuts against one side of the member 20. The generally flat or planar portion 21 of a member 20 is shown having embedded therein the relatively sharp edge 33 of the locking means of washer 36. The shaft of the bolt 28 goes through the hole 38 of the washer 36. Greater flexibility and positioning of the washer 36 relative to the flat surface 21 of the member 20 may also be provided by enlarging the cross-section or diameter as the case may be of the hole 38. Since the edges 39 penetrate into or cut into the relatively flat surface 21 of the member 20, it can be seen that lateral movement of the member or washer 36 relative to member 20 is reduced or eliminated. Since the interlocking connection between the member 36 and the flat surface 21 of the member 20 at the region of the edges 33 is not made until adjustment or positioning of the member 20 with respect to the member 24 for example, as shown in FIG. 1 has been completed then it can be seen that the two members 20 and 24 are relatively continuously adjustable with respect to each other. That is, within the limits of the overall range of adjustment a generally infinite number of adjustment positions are possible for the members 20 and 24. This is a feature which distinguishes over much of the prior art where only discrete or incremental adjustment between interlocking members is usually possible.

Figure 3:
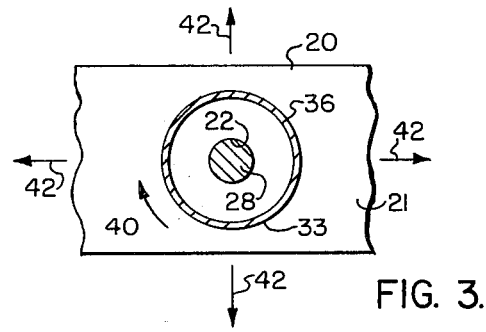
FIG. 3 shows a section along lines III—III of FIG. 2.

Referring now to FIG. 3, a cut-away view of the detailed interlocking relationship shown in FIG. 2 is shown along lines III—III of FIG. 2. Here, the flat surface 21 of the member 20 is shown. The shaft of the bolt 28 is shown protruding through the hole 22 in the member 20. A portion of the washer 26 which in this embodiment is generally circular and cylindrical, is depicted. It will be noted that because of the interlocking capability of the edge 33 to the flat surface 21, motion in any direction such as 42 which is radial to the center line of the bolt 28 is prevented. However, rotational motion as indicated by 40 may take place. That is, the member 36 may rotate with respect to the member 20 but not move laterally relative thereto. Rotation motion may also be prevented by appropriately tightening the mechanism 27 shown in FIG. 1.

Figure 4:
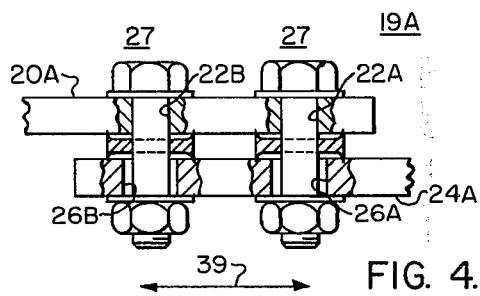
FIG. 4 shows a two member, double bolt interconnection.

Referring now to FIG. 4, another embodiment of the invention is shown. In this embodiment of the invention a member 20A having two holes or openings therein generally designated 22A and 22B is interconnected with a member 24A having two complementary holes or openings therein 26A and 26B. The interlocking apparatus or mechanism 27 as described in FIG. 1 is shown cooperating with the previously described holes 22A, 22B, 26A and 26B to provide a double interlocked link apparatus 19A. Link apparatus 19A has the advantage of not only being securely fixed, after adjustment in the plane indicated by 39, but also generally securely fixed in terms of rotation of the member 24A relative to member 20A. The locking apparatus, mechanism or means 27 shown in this embodiment of the invention cooperate with other portions of the linking apparatus portions in a manner generally described with respect to mechanism 27 shown in FIG. 1.

Figure 5:
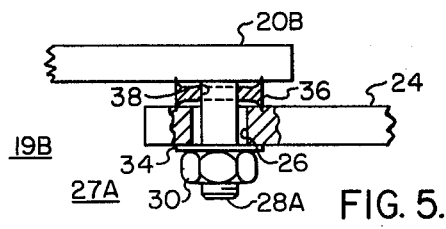
FIG. 5 shows a two member, single stud interconnection.

Referring now to FIG. 5 another embodiment of the invention is shown in which an interlinking adjustable apparatus 19B is provided. Means 19B comprises a locking apparatus 27A having with a member 20B a stud portion 28A integral therewith. Stud portion 28A may have a threaded end. There is provided a second member 24 which is disposed in spaced relationship with a member 20B similar to spaced relationship described between the members 20 and 24 shown in FIG. 1. An interlocking washer 36 is shown disposed between the member 20B and the member 24. The stud 28A of member 20B cooperates with the hole 26 in member 24 to allow adjustment of member 24 relative to member 20B. After lateral adjustment the members 20B and 24 are secured by tightening the nut 30 against the washer 34 to cause compression to be exerted by the member 20B and the member 24 against the serrated edges 33 of the member 36.

Figure 6:
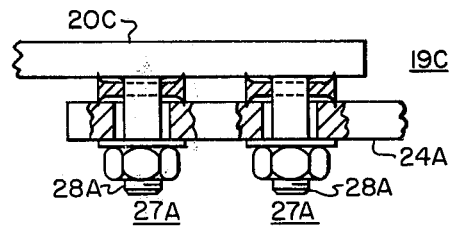
FIG. 6 shows a two member, double stud interconnection.

Referring now to FIG. 6 an interlocking apparatus or interlinking connection 19C between two members 20C and 24A is shown. There is provided a first member or portion 20C having two stud portions 28A similar to the stud 28A shown in FIG. 5. Interlocking means 27A is provided in two places so that the member 20C may be first adjusted, and then secured to a corresponding member 24A.

Figure 7:
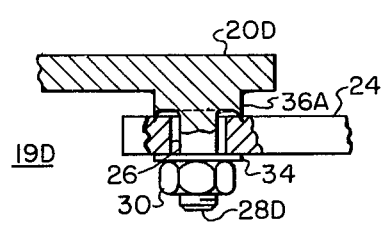
FIG. 7 shows a two member, combination stud and lock means interconnection.

Referring now to FIG. 7 still another embodiment 19D of the invention is shown. In this embodiment a member 20D is provided with an integral locking means 36A having a stud 28D. Member 20D cooperates with an adjustable portion or member 24 in a manner described previously with respect to other embodiments of the invention for adjusting and securing the two members 20D and 24. As the oversized hole 26 is provided to allow a great range of flexibility in the adjustment, fixing of the adjustment is provided by tightening the bolt 30 against the washer 34 to compress the members 20D and 24 so that the edges 33 of the locking means 36A bite into or cut into the surface of the member 24.

Figure 8:
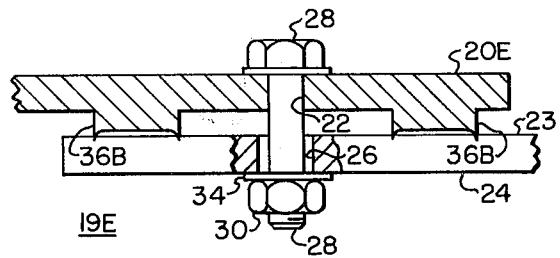
FIG. 8 shows a two member, single bolt, double lock means interconnection.

Referring now to FIG. 8 there is shown still another embodiment of the invention 19E. In this embodiment there is provided a first member 20E which may have one, two or a plurality of integral locking members 36B. Members 36B have no central holes therein nor do they have protruding studs as in other embodiments. In this embodiment of the invention two interlocking means 36B are shown for reasons of simplicity of illustration. Member 20E is adjustable and interlockable in relatively fixed relationship with a member 24 by providing a bolt 28 through a hole 22 in the member 20 and then through a larger hole 26 in member 24. The means for adjustment and the method of adjustment has been described previously with respect to other embodiments of the invention. Fixing of the adjustment is accomplished by tightening the bolt 30 against the washer 34 thus causing members 24 and 20E to be joined causing the serrated edges or sharp edges of the members 36B to embed in the surface 23 of the member 24, thus fixing the adjustment between or disposition of the members 20E and 24.

Referring now to FIG. 9 still another embodiment 19F of the invention is shown in which a member 20F is adjustable and fixable or securable with respect to a member 24. In this case, there is provided an integral locking portion 36C with the member 20F, with the member 36C having a central hole 22A therein through which the shaft of a bolt 28 protrudes or extends. The shaft also extends through a hole 26 in the member 24. Once again, the adjustment is fixable by tightening the nut or member 30 against the washer 34 on the threaded end of the shaft of the bolt 28.

Referring now to FIG. 10 still another embodiment 19G of the invention is shown. In this case, members 20G and 24B which are curvilinear in shape are joined in a manner previously described with respect to other embodiments of the invention. Member 20G has a stud portion 28E protruding therefrom and integral therewith in this embodiment of the invention. Member 24B has an opening 26 therein through which the protrusion 28E extends. A locking means or washer 36 is provided, such that the shaft of bolt 28E extends through a hole 38 therein. A bolt 30 is threaded on the threaded portion of shaft 28E to thereby place a force of compression on a washer 34 to thereby cause a compression force to be exerted between members 20G and 24B against the locking means 36 to cause the serrated or sharp edges thereof to bite into the curvilinear or arcuate surfaces 21B and 23B.

Referring now to FIG. 11 still another embodiment 19H of the invention is shown. In this embodiment the joining or locking combination 27 described previously with respect to FIG. 1 is utilized to join one member 20 with a second similar member 20. In this case the holes or openings 22 in both members 20 are approximately of the same size or cross section as that of the shaft of the bolt 28. Although no means for adjustment is provided between the two members 20 nevertheless secure rigid interlinking thereof is accomplished by utilizing the concepts of the invention described herein.

Referring now to FIG. 12 and FIG. 12A a locking means 36E which may be utilized in various embodiments of this invention is shown. In this case, the embodiment described herein is useful not only for providing rigid interconnection between two members, but also prevents rotation about a central axis. This is because the shape of the member 36E is rectangular. An edge 39A is shown which may dig into a surface of one of the members as a compression force is applied. The bolt or compression member or linking member (not shown) may feed through the opening 37A as shown in FIG. 12.

Referring to FIG. 13A still another useful locking means member 36F is shown. In this case there are radial arms disposed about a central hub. Serrated or sharp edges 39B are shown extending along the radial arms for digging into or wedging into the surface of one of the members to be linked. A central hole 37B is provided where a bolt or similar locking means may be provided in a manner previously described with respect to other embodiments of the invention.

Referring now to FIG. 14 there is shown circuit apparatus 50 utilizing the concepts of the present invention. The circuit breaker 50 which utilizes the concepts of the present invention may be of the type known as "15 Kv, DHP Circuit Breaker" which is manufactured and sold by the assignee of the present invention. Circuit breaker 50 is generally known as the magnetic air circuit breaker of the post insulator type. Of course it is to be understood that the specific kind of circuit breaker which utilizes the concepts of this invention is not limiting but is merely illustrative as one embodiment and one example. The circuit breaker 50 comprises in this embodiment of the invention three pole units generally designated A, B, C. There is a movable base unit 52 upon which the pole units A, B and C are disposed in spaced relationship to each other. There are insulator units 54 which support horizontally oriented plug in connectors 56 and 58. Connectors 56 and 58 are insulated from one another by part of the pole unit or insulating unit 54. There is provided a movable bridging section or conductor section 60 which is, in this embodiment of the invention, hinged at one end thereof to one portion of the plug in connector 56. The other end 62 thereof is adapted to be moved, for example, in an arcuate path to engage a locking or jaw portion 64 at one end of the previously described plug in member 58. The bridge member 60 may be driven by an insulated driving means or bar 65 which is utilized to transfer force or motion from a closing mechanism (not shown) in the base 52 of the circuit breaker apparatus 50 to the bridge member 60. To close the circuit breaker contacts the operating bar or pole 65 is generally moved upward to cause the bridging portion 60 to move in an arcuate path such that the connecting members 62 and 64 are engaged. This provides a generally short circuit path or path of electrical continuity between the connecting or plug in portions 56 and 58.

Figure 15:
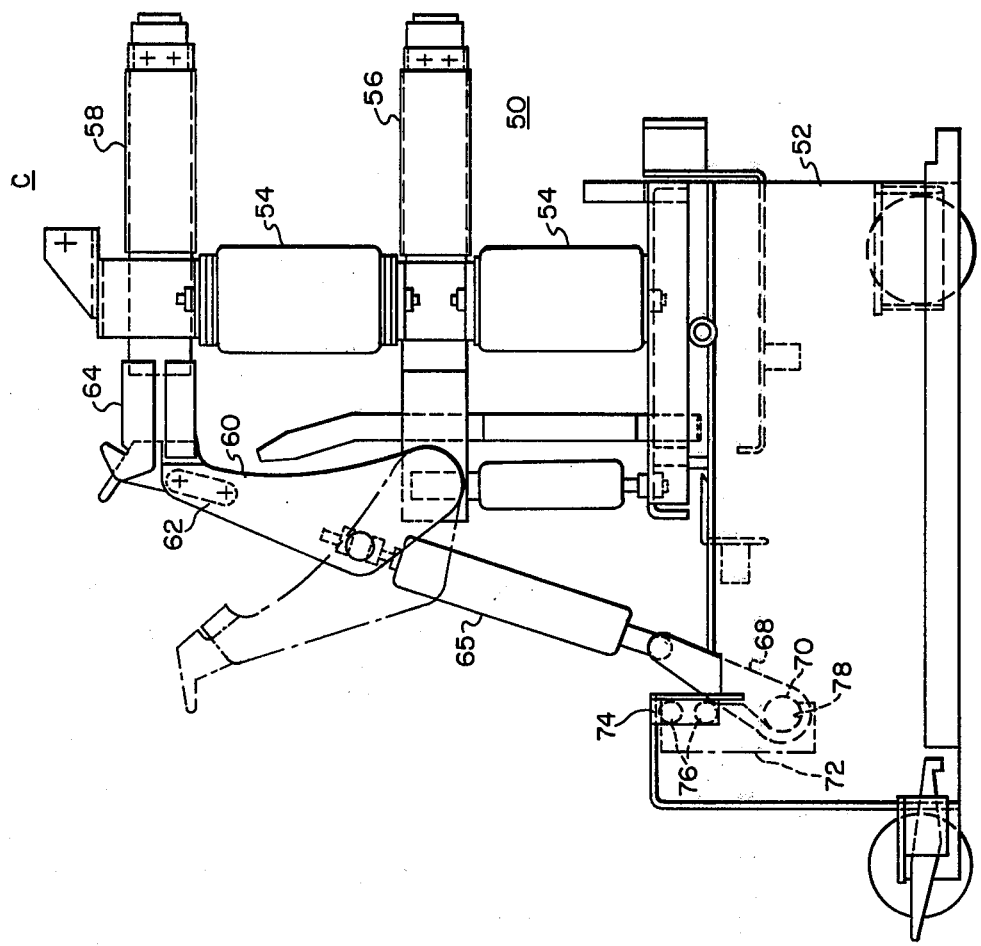
FIG. 15 shows a side view of the circuit breaker of FIG. 14.

Referring now to FIG. 15 a side view showing pole C of the previously described circuit breaker 50 is shown. The base 52 is shown supporting the insulating columns 54 which in turn insulate and support the drawout connecting means or connectors 56 and 58. The bridging member 60 in this case is shown in the closed position such that portion 62 is engaged with and interlocked with portion 64, thus providing a complete circuit path between the connector members 56 and 58. The push rod 65 is shown in the position it adapts when the bridging member 60 is closed. There is shown an interconnecting link 68 which is disposed upon a revolvable shaft 70 which is utilized to cause the bar 65 to move to thus cause the bridging member 60 to open and close member. Shaft member 70 is supported at some portions thereof by bearing support. That is, the portion 70 is supported in a cantilevered fashion from a bearing surface. Under some conditions of electrical current flow and under some conditions of magnetic interreaction a force is induced at portion 62 of the bridging member 60 which attempts to cause the bridging member 60 to open, thus attempting to force the bar 65 in a downward direction, thus attempting to rotate shaft 70 through lever 68. Since shaft 70 has previously been locked by internal mechanisms within the base 52 (not shown) the shaft 70 will not rotate regardless of the force supplied through the linkages 60, 65 and 74. However, the cantilevered shaft 70 will tend to deflect or bend downward. Consequently, an outboard support member 72 is provided to support shaft 70 at a point 78. Two bolts 76 are provided to interconnect the support member 72 with a support portion 74 of the base 52. In the installation operation of the member 72, it is important to have the portion or region 78 in a fairly precise position against the bottom of the shaft 70. Consequently, the need for providing interlinking cooperation between the member 72 and the member 74 is required initially during installation. However, after installation, rigid secured cooperation between members 72 and 74 is required so that the force supplied through members 60, 65 and 68 will not loosen the interconnection between members 72 and 74.

Figure 16:
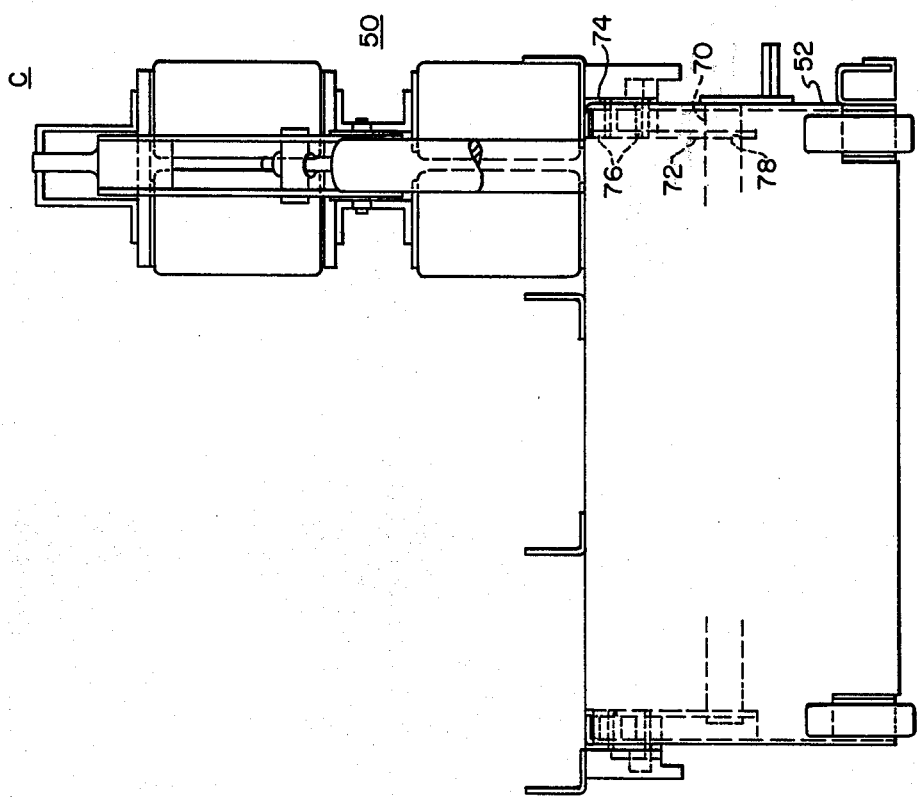
FIG. 16 shows a front view of the circuit breaker of FIG. 14.

Referring now to FIG. 16 a front view of the apparatus 50 shown in FIGS. 14 and 15 is depicted. The pole unit C is shown in its proper position, the other pole units A, B are deleted for purposes of illustration.

The base unit 52 has a vertical portion 74 thereof which is generally rigidly attached to and part of the base unit 52. To this vertical portion 74 support member 72 is attached by way of bolt or bolts 76. Support member 72 supports the shaft 70 at a point 78 to prevent the previously described shaft flexure from taking place to a significant degree.

Referring now to FIG. 17 the general shape and cooperating arrangement between the jackshaft 70 and the supporting member 72 is shown. It will be noted that support member 72 supports the jackshaft 70 at point 78 to prevent it from deflecting downwardly. Holes 77 are provided in the upper portion or vertical portion of the support member 72 to allow adjustment.

Referring now to FIG. 18 the region of circuit interrupter 50 at the point where the member 72 is joined to portion 74 is shown. Member 74 is shown as a vertical member. Member 72 is shown as a parallel spaced vertical member which supports the jackshaft 70 at point 78. There are provided two bolts 76 which extend through holes 75 in member 74 and holes 77 in member 72. There are provided interlocking means 79 between the members 74 and 72 on the shafts of the bolts 76. The bolts 76 are attached at the threaded ends thereof to nuts 80 which may be turned upon the threaded ends of the bolts 76 to compress the locking members or washers 78 between the members 74 and 72 to thus cause the serrated or sharp raised circumferential edges of the means or washer 78 to bite into the inner surfaces of the member 74 and 72 thus rigidly locking into place the members 72 and 74. During installation the bolts 80 are put on relatively loosely and the jackshaft support member 72 is moved up or down until the proper physical contact between the member 72 and jackshaft 70 is achieved at 78, then the bolts 80 are tightened and a relatively rigid interconnection between members 74 and 72 is made. Of course it is to be understood with regard to this embodiment of the invention as it applies to the circuit breakers shown in FIGS. 14, 15, 16 that the arrangement shown in FIG. 18 is not limiting and that other arrangements for interlinking connections, such as shown in FIGS. 1-11 may be utilized to connect member 72 to member 74.

Figure 19:
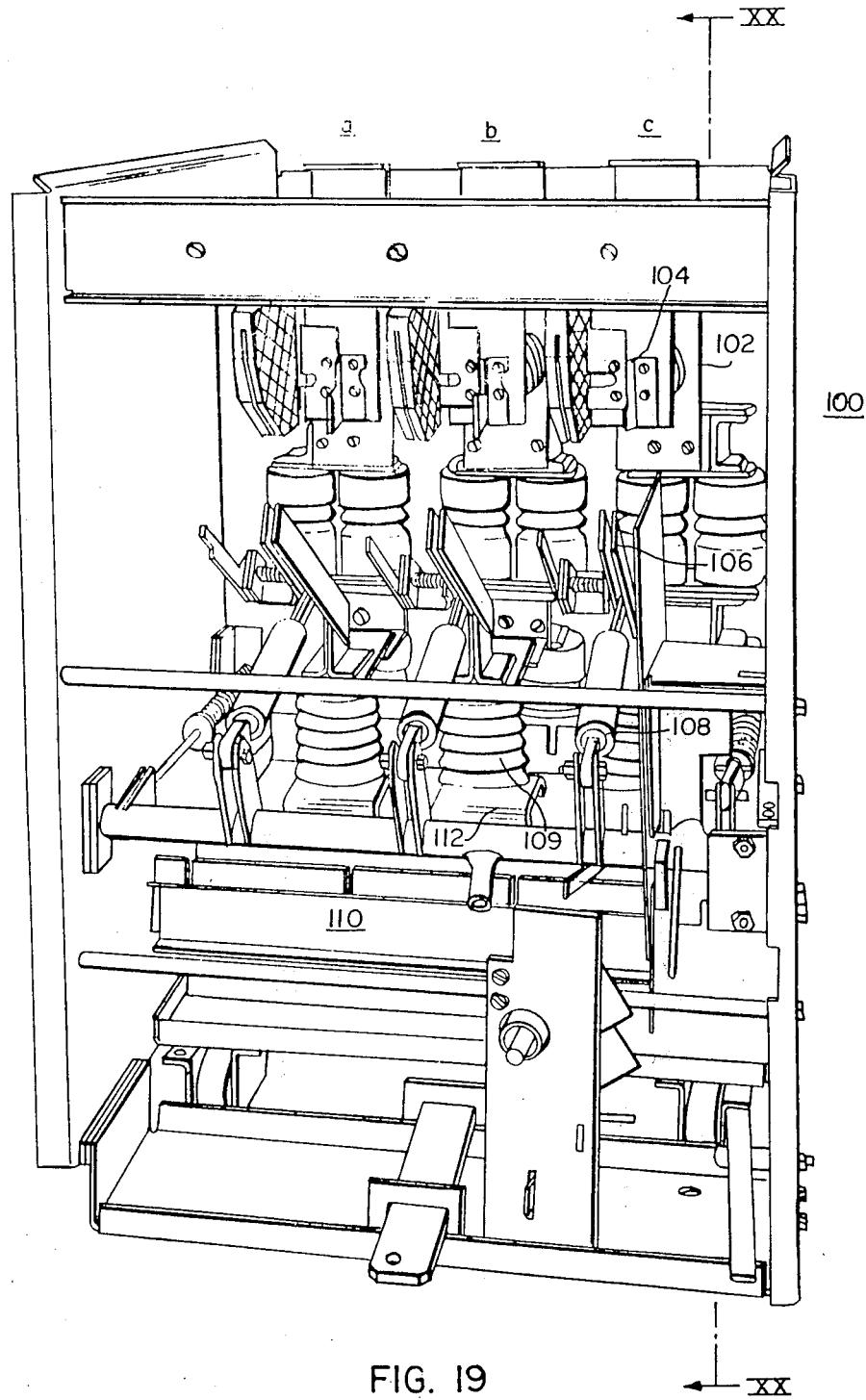
FIG. 19 shows a three pole switch utilizing the invention.

Referring now to FIG. 19 still another embodiment of the invention shows an interrupter switch 100. The interrupter switch apparatus 100 shown in FIG. 19 may be of the type generally known as "15 Kv, ssp Interrupter Switch" the type sold and manufactured by the assignee of the present invention. Interrupter 100 comprises three pole pieces, a, b and c. In each pole piece there is provided an upper connecting portion 102 having a locking or engaging portion 104 thereon. There is also provided a movable switchblade 106 which is operable to interconnect with locking portion 104. There is also provided a driving shaft 108 which causes bridge or movable conducting member 106 to move. The previously described members are supported by insulating support member 109. At the base of support member 109 in the region 112 locking means are utilized. There is a closing mechanism 110 which is provided to move the members 108 and 106 to cause opening or closing of the switch member.

Figure 20:
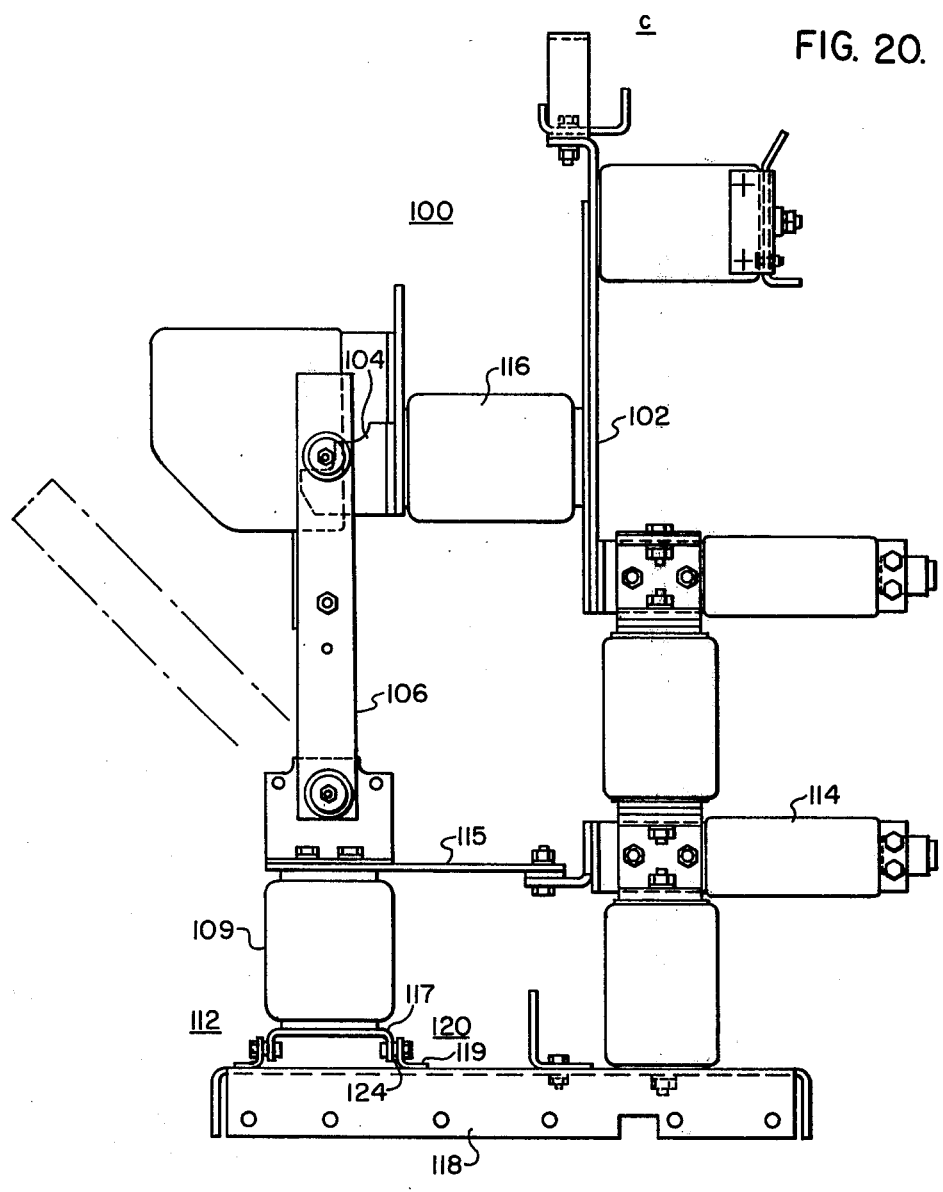
FIG. 20 shows a simplified side view of the switch in FIG. 19 through section XX—XX.

Referring now to FIG. 20 there is shown a side view of a portion of the embodiment shown in FIG. 19. The upper conducting member 102 is shown interconnected with the locking member 104 by the member 116. Switch member 106 is shown in the closed position such that it is interlocked with the locking interconnecting portion 104. The bottom of the switch member 106 is connected to one end of a drawout connector 114. The insulating base 109 is securely attached to base member 118 in the region 112. The interconnection apparatus is generally designated 120. A channel member 117 on the bottom of the base member 109 is innerconnected with an angle member 119 which is securely attached to base member 118.

Referring once again to FIG. 19 it can be shown that if the switch members 106 of the pole pieces a, b and c are engaged with latch members 104 there is a tendency for the switch members 106 to be drawn laterally toward one another as electrical current flows therethrough because of electro-magnetic effects. Consequently, it is important that the entire pole unit supporting the member 106 be rigidly attached to the base 118 (not shown) to prevent this lateral movement. However, it is also important that in the initial alignment of the pole unit the relative disposition of the movable switch portion 106 with the jaw member 104 be correct, otherwise contact may not occur when the switch member 106 is closed on member 104. The adjustable means 120 shown in FIG. 20 accomplishes this purpose.

Figure 21:
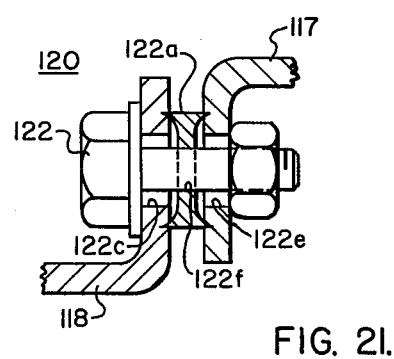
FIG. 21 shows a partially broken away partially sectional view of a portion of the switch of FIG. 19.

Referring now to FIG. 21, the interconnection of the members 118 and 117 in the left portion of 112 (of FIG. 20) is shown. There is provided a bolt 122 which feeds through a hole 122c in member 118 and through a hole 122e in member 117. An interlocking member 122a is provided between the two members 118 and 117. Interlocking member 122a has a central hole 122f through which the shaft of the bolt 122 extends. Either hole 122c or hole 122e or both may be relatively larger than the shaft between the elements 118 and 117 to thereby allow adjustment or alignment of elements 118 and 117, in a manner previously described with respect to other embodiments of this invention. Once proper alignment has been achieved a nut 122b can be tightened on the shaft of the bolt 122b thus compressing the member 122a between the members 118 and 117. The sharp circumferential edges of the member 122a will dig into or wedge into the facing surfaces of the members 118 and 117, thus causing a rigid interlinking therebetween. With regard to the embodiment of the invention shown in FIGS. 19, 20, 21, it is once again to be understood that the concepts shown and utilized in the embodiments of FIGS. 1-11 may also be utilized in the apparatus of FIGS. 19, 20 and 21.

It is to be understood, with respect to the embodiments of this invention, that none of the arrangements shown herein are limiting. It is also to be understood that the relatively flat surfaces shown in various embodiments of this invention are not limiting and that curvilinear surfaces similar to those shown in FIG. 10 may be utilized in various embodiments of this invention. It is also to be understood that the relative cross sectional shape of the locking means or washer generally designated 36 in some embodiments of this invention is not limiting. It is also to be understood that the edge, generally designated 33 in some embodiments of this invention, need not be continuous but may be serrated or discontinuous. It is also to be understood with respect to the various embodiments of the invention that the interlocking unit 36 is primarily connected between the two members that are to be rigidly joined and the interlocking member 36 is not provided to prevent rotation of a nut.

The apparatus shown and method described in regard to the various embodiments of this invention have many advantages. One advantage is the fact that two or more members may be interlinked in an adjustable fashion, that is, one member may be adjusted within limits relative to another and then the two members may be securely fixed to one another utilizing the concepts of this invention. Another advantage lies in the fact that the adjustment and subsequent fixing of the positions of the members is continuous. That is, any position within the ranges defined by the sizes of the holes or openings etc. may be employed for setting the relative dispositions of the members. Another advantage lies in the fact that the concepts of the present invention may be utilized to improve the construction and alignment of a circuit interrupter and the construction and alignment of various portions of a switch member.

What we claim is:

1. An adjustable link, comprising:
    a first member having a generally planar surface;
    a second member having a generally planar surface, said first member and said second member being disposed in spaced relationship, said planar surfaces being disposed in face to face relationship in parallel planes;
    lock means disposed between said planar surfaces, said lock means having oppositely disposed edge portions which are generally transverse to said parallel surfaces for cutting into said surfaces as a compression force is applied to said first and said second members against said locking means and transverse to said parallel surfaces, said first and said second members being movable relative to one another within limits in a direction parallel to said parallel surfaces for adjustment of the disposition of said first member relative to said second member before said compression force is applied; and
    compression means for applying said compression force to said first and said second members after said adjustment has been made for thereby providing a generally rigid link.

2. The combination as claimed in claim 1 wherein said first member and said second member each have an opening therein, said compression means comprises a bolt and complementary nut disposed thereupon, said bolt having a predetermined cross-section, one of said openings having a cross-section larger than said cross-section of said bolt, said bolt extending through both of said openings, said member with said larger cross-section opening being movable around said bolt for said adjustment.

3. The combination as claimed in claim 2 wherein said lock means has a central opening therein through which said bolt extends.

4. The combination as claimed in claim 3 wherein said lock means comprises a generally circular washer having a circumferential edge, said washer not significantly changing shape while cutting into said planar surface.

5. An adjustable link, comprising:
    a first member having a generally planar surface;
    a second member having a generally planar surface, said first member and said second member being disposed in spaced relationship, said planar surfaces being disposed in face to face relationship in parallel planes;
    lock means disposed between said planar surfaces, said lock means being integral to one of said members, said lock means having an edge portion which is genrerally transverse to said parallel surfaces for cutting into said surface of said other member when a compression force is applied to said first and said second members against said locking means and transverse to said parallel surfaces, said first and said second members being movable relative to one another within limits in a direction parallel to said parallel surfaces for adjustment of the disposition of said first member relative to said second member before said compression force is applied; and
    compression means for applying said compression force to said first and said second members after said adjustment has been made for thereby providing a generally rigid link.

6. The combination as claimed in claim 5 wherein said first member and said second member each have an opening therein, said compression means comprises a bolt and complementary nut disposed thereupon, said bolt having a predetermined cross-section, one of said openings having a cross-section larger than said cross-section of said bolt, said bolt extending through both of said openings, said member with said larger cross-section opening being movable around said bolt for said adjustment.

7. The combination as claimed in claim 6 wherein said lock means has a central opening therein through which said bolt extends.

8. Circuit breaker apparatus, comprising:
    separable main contacts;
    operating means for opening and closing said separable main contacts, said operating means comprising movable shaft means for causing said separable main contacts to open and close;
    adjustable support means for supporting a portion of said shaft means, comprising:
    a first member having a generally planar surface;
    a second member having a generally planar surface, said first member and said second member being disposed in spaced relationship, said planar surfaces being disposed in face to face relationship in parallel planes;
    lock means disposed between said planar surfaces, said lock means having oppositely disposed edge portions which are generally transverse to said parallel surfaces for cutting into said surfaces as a compression force is applied to said first and said second members against said locking means and transverse to said parallel surfaces, said first and said second members being movable relative to one another within limits in a direction parallel to said parallel surfaces for adjustment of the disposition of said first member relative to said second member before said compression force is applied; and
    compression means for applying said compression force to said first and said second members after said adjustment has been made for thereby providing a generally rigid link.

9. The combination as claimed in claim 8 wherein said first member and said second member each have an opening therein, said compression means comprises a bolt and a complementary nut disposed thereupon, said blot having a predetermined cross-section, one of said openings having a cross-section larger than said cross-section of said bolt, said bolt extending through both of said openings, said member with said larger cross-section opening being movable around said bolt for said adjustment.

10. The combination as claimed in claim 9 wherein said lock means has a central opening therein through which said bolt extends.

11. The combination as claimed in claim 10 wherein said lock means comprises a generally circular washer having a circumferential edge, said washer not significantly changing shape while cutting into said planar surfaces.

12. Circuit breaker apparatus, comprising:
separable main contacts;
operating means for opening and closing said separable main contacts, said operating means comprising movable shaft means for causing said separable main contacts to open and close;
adjustable support means for supporting a portion of said shaft means, comprising:
a first member having a generally planar surface;
a second member having a generally planar surface, said first member and said second member being disposed in spaced relationship, said planar surfaces being disposed in face to face relationship in parallel planes;
lock means disposed between said planar surfaces, said lock means being integral to one of said members, said lock means having an edge portion which is generally transverse to said parallel surfaces for cutting into said surface of said other member when a compression force is applied to said first and said second members against said locking means and transverse to said parallel surfaces, said first and said second members being movable relative to one another within limits in a direction parallel to said parallel surfaces for adjustment of the disposition of said first member relative to said second member before said compression force is applied; and
compression means for applying said compression force to said first and said second members after said adjustment has been made for thereby providing a generally rigid link.

13. The combination as claimed in claim 12 wherein said first member and said second member each have an opening therein, said compression means comprises a bolt and complementary nut disposed thereupon, said bolt having a predetermined cross-section, one of said openings having a cross-section larger than said cross-section of said bolt, said bolt extending through both of said openings, said member with said larger cross-section opening being movable around said bolt for said adjustment.

14. The combination as claimed in claim 13 wherein said lock means has a central opening therein through which said bolt extends.

15. Switch means, comprising:
spaced main contact means;
bushing means for supporting said spaced main contact means;
movable pole piece means disposed on said bushing means for providing a disconnectable conducting path between said spaced main contact means;
base means for supporting said bushing means, said base means having a generally planar surface, said bushing means having a generally planar surface, said base means and said bushing means being disposed in spaced relationship with said planar surfaces thereof being disposed in face to face relationship in parallel planes;
lock means disposed between said planar surfaces, said lock means having oppositely disposed edge portions which are generally transverse to said parallel surfaces for cutting into said surfaces as a compression force is applied to said base means and said bushing means against said locking means and transverse to said parallel surfaces, said base means and said bushing means being movable relative to one another within limits in a direction parallel to said parallel surfaces for adjustment of the disposition of said bushing means relative to said base means before said compression force is applied; and
compression means for applying said compression force to said base means and said bushing means after said adjustment has been made for thereby providing an adjusted generally rigid relationship between said base means and said bushing means.

16. The combination as claimed in claim 15 wherein said base means and said bushing means each have an opening therein, said compression means comprises a bolt and complementary nut disposed thereupon, said bolt having a predetermined cross-section, one of said openings having a cross-section larger than said cross-section of said bolt, said bolt extending through both of said openings, said member with said larger cross-section opening being movable around said bolt for said adjustment.

17. The combination as claimed in claim 16 wherein said lock means has a central opening therein through which said bolt extends.

18. The combination as claimed in claim 17 wherein said lock means comprises a generally circular washer having a circumferential edge, said washer not significantly changing shape while cutting into said planar surfaces.

19. Switch apparatus, comprising:
bushing means for supporting said spaced main contact means;
movable pole piece means disposed on said bushing means for providing a disconnectable conducting path between said spaced main contact means;
base means for supporting bushing means, said bushing means having a generally planar surface, said base means having a generally planar surface, said base means and said bushing means being disposed in face to face relationship in parallel planes;
lock means disposed between said planar surfaces, said lock means being integral with either said base means or said bushing means, said lock means having an edge portion which is generally transverse to said parallel planes for cutting into said surface of the other of said base means or said bushing means when a compression force is applied to said base means and said bushing means against said locking means and transverse to said parallel surfaces, said bushing means and said base means being movable relative to one another within limits in a direction parallel to said parallel surfaces for adjustment of the disposition of said base means relative to said bushing means before said compression force is applied; and
compression means for applying said compression force to said base means and said bushing means after said adjustment has been made for thereby providing an adjusted generally rigid relationship between said base means and said bushing means.

20. The combination as claimed in claim 19 wherein said base means and said bushing means each have an opening therein, said compression means comprises a bolt and complementary nut disposed thereupon, said bolt having a predetermined cross-section, one of said openings having a cross-section larger than said cross-section of said bolt, said bolt extending through both of said openings, said member with said larger cross-section opening being movable around said bolt for said adjustment.

21. The combination as claimed in claim 20 wherein said lock means has a central opening therein through which said bolt extends.

22. A method for aligning and securing two members having relatively flat surfaces, including the steps of:
placing a hole of given predetermined cross-section in one of said members so that said hole extends through said flat surface thereof;
placing a hole of a given predetermined cross-section in the other of said members so that said latter hole protrudes through said other flat surface;
disposing a locking means having a central hole and oppositely disposed sharp edges capable of piercing said flat surfaces between said flat surfaces;
disposing a bolt of given predetermined cross-section which cross-section is smaller than the previously described cross-section of said hole in said members through all of said holes;
affixing a nut on the other end of said bolt and revolving said nut until said two flat surfaces are lightly compressed against said locking member without said locking member significantly piercing said flat surfaces;
adjusting said members generally laterally of said flat surfaces until the desired adjustment position is achieved; and
tightening said bolt further to provide compressive force against said edges of said locking means to thereby embed said edges in said flat surfaces to thereby prevent further transverse lateral movement of said two members relative to said bolt.

* * * * *